United States Patent [19]

Kwon

[11] Patent Number: 4,624,569

[45] Date of Patent: Nov. 25, 1986

[54] REAL-TIME DIFFRACTION INTERFEROMETER

[75] Inventor: Osuk Y. Kwon, San Jose, Calif.

[73] Assignee: Lockheed Missiles & Space Company, Inc., Sunnyvale, Calif.

[21] Appl. No.: 514,875

[22] Filed: Jul. 18, 1983

[51] Int. Cl.$^4$ .................................................. G01B 9/02
[52] U.S. Cl. ..................................... 356/354; 356/359
[58] Field of Search ............... 356/345, 353, 354, 359, 356/360

[56] References Cited

PUBLICATIONS

Smartt and Strong, "Point–Diffraction Interferometer", Abstract ThB12, *JOSA*, vol. 62, No. 5, p. 737, May 1972.

Smartt and Steel, "Theory and Application of Point-Diffraction Interferometers", *Proc. ICO Conf. Opt. Methods in Sci. and Ind. Meas.*, Tokyo, pp. 351–356, 1974.

Koliopoulos et al., "Infrared Point–Diffraction Interferometer", *Optics Letters*, vol. 3, pp. 118–120, Sep. 1978.

Braning, *Optical Shop Testing*, John Wiley and Sons, pp. 409–437, 1978.

Quercioli et al., "Contrast Reversal With a Point–Diffraction Interferometer With a Carrier Frequency", *Optics Comm.*, vol. 35, No. 3, 12/80, pp. 303–306.

Koliopoulos, "Interferometric Optical Phase Measurement Techniques", Doctoral Dissertation, U. of Arizona, 1981.

*Primary Examiner*—Davis L. Willis
*Assistant Examiner*—Matthew W. Koren
*Attorney, Agent, or Firm*—John J. Morrissey

[57] ABSTRACT

A real-time diffraction interferometer for analyzing an optical beam comprises converging means (13) for bringing the beam to a focus at focal point (14), and an apertured grating structure (20) positionable adjacent the focal point (14). The apertured grating structure (20) comprises a transparent substrate (10'), an obverse surface of which is coated with a translucent coating (11) except for a pinhole-sized spot (12) that is left uncoated so as to function as an aperture in the coating (11). A reverse surface of the substrate (10') has a lenticulate surface configuration, which functions as a diffraction grating. The beam incident upon the apertured grating structure (20) is separated into a major portion, which is transmitted with attenuated intensity through the translucent coating (11), and a minor portion, which is transmitted with undiminished intensity through the pinhole aperture (12). The major portion of the beam is diffracted into spatially separated diffraction components, and the minor portion of the beam is diffracted by the pinhole aperture (12) so as to acquire a spherical wavefront. Interference patterns produced by interference of the spherical wavefront with each of the wavefronts of the zeroth order and the positive and negative first-order diffraction components of the intensity-attenuated beam transmitted by the coating (11) are separately imaged on conventional solid-state photodetectors (21, 22 and 23).

18 Claims, 6 Drawing Figures

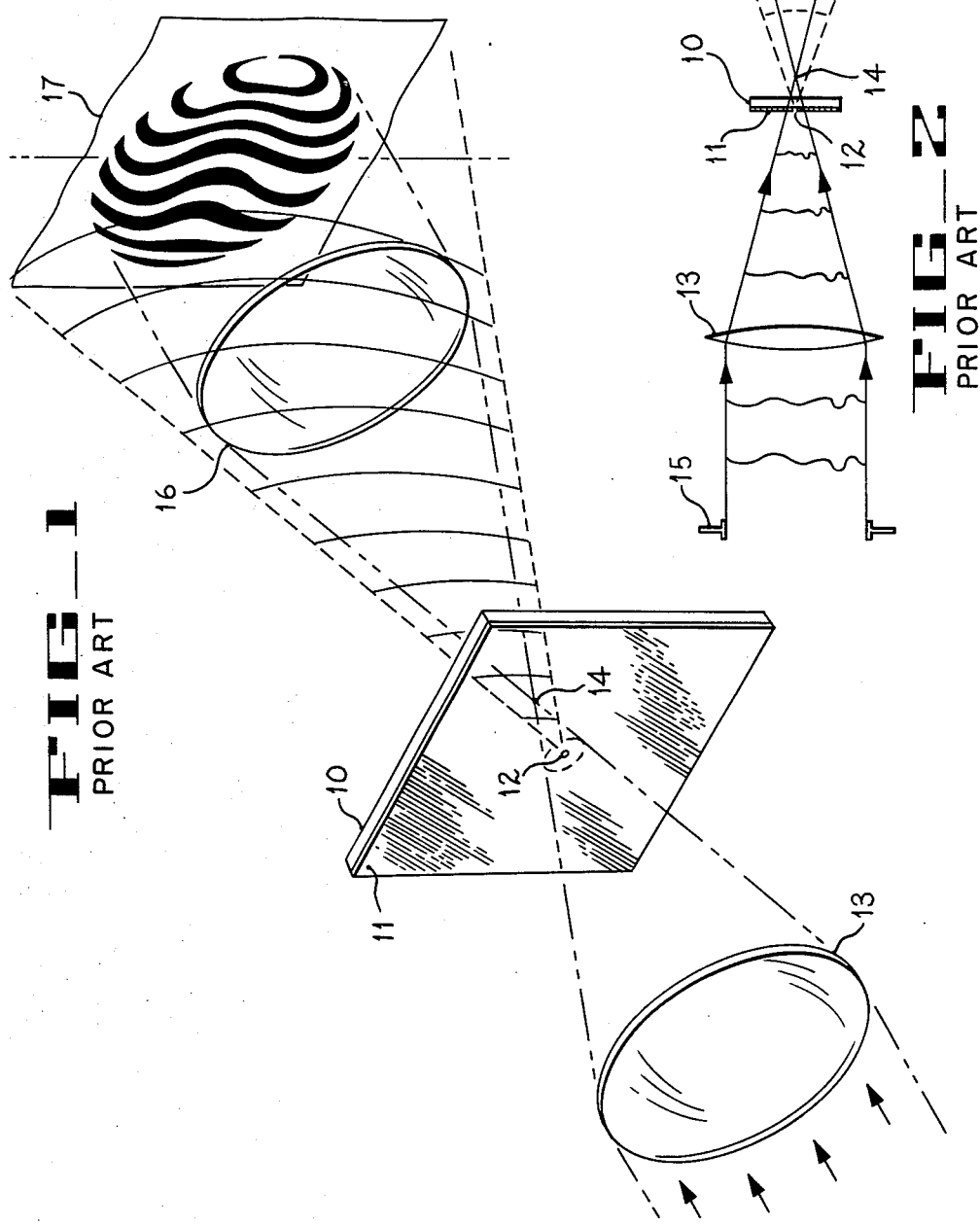

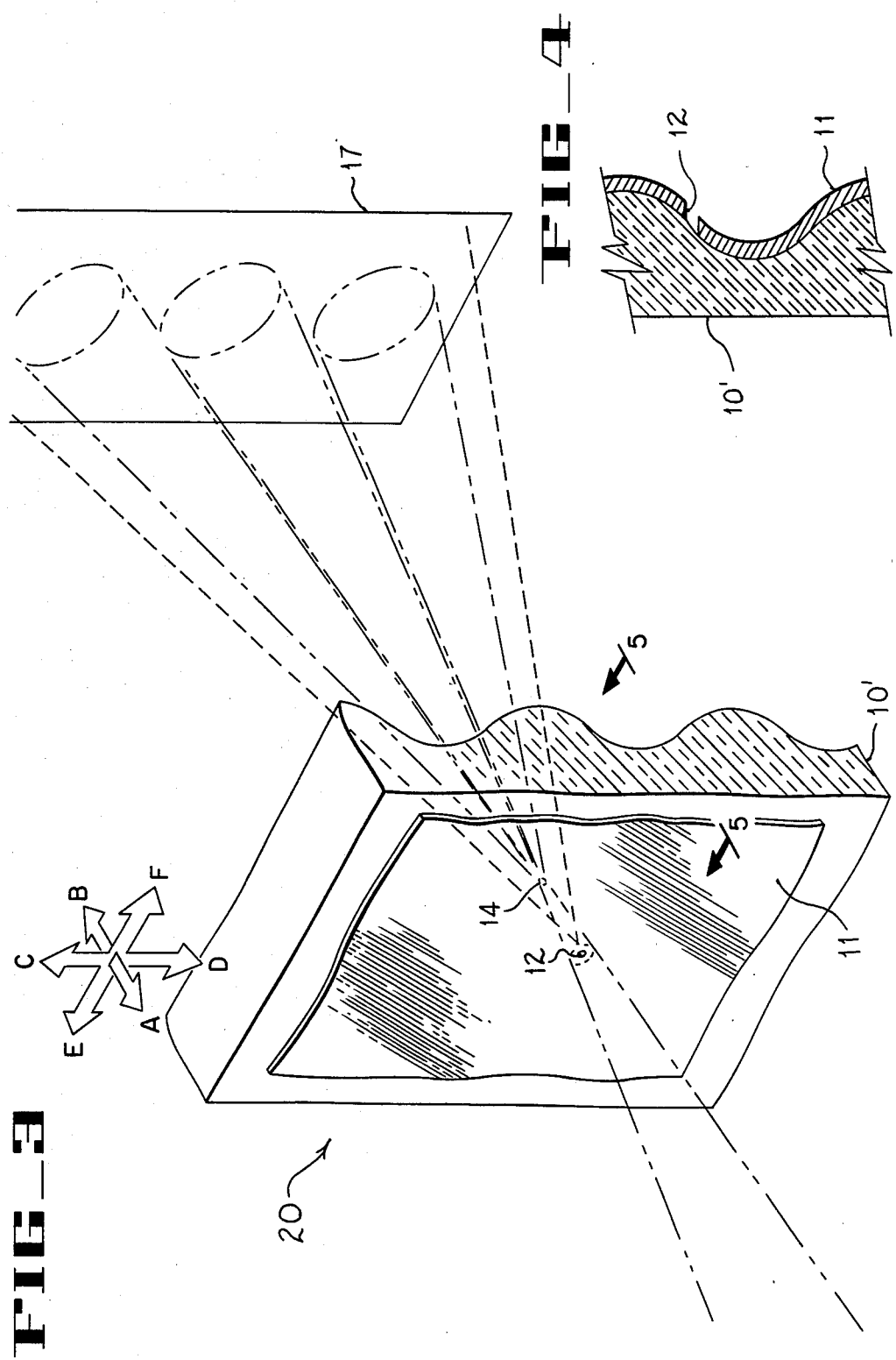

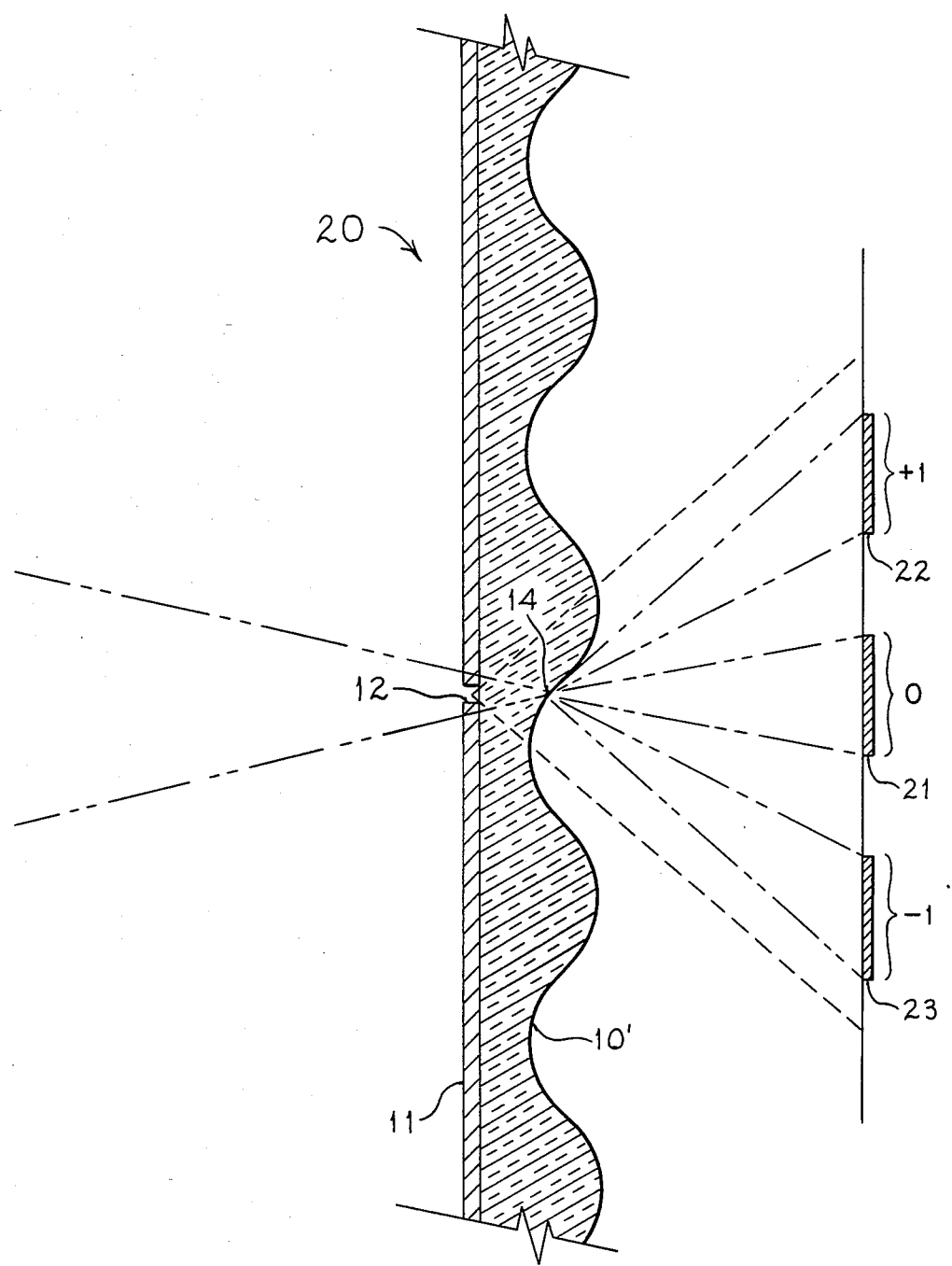

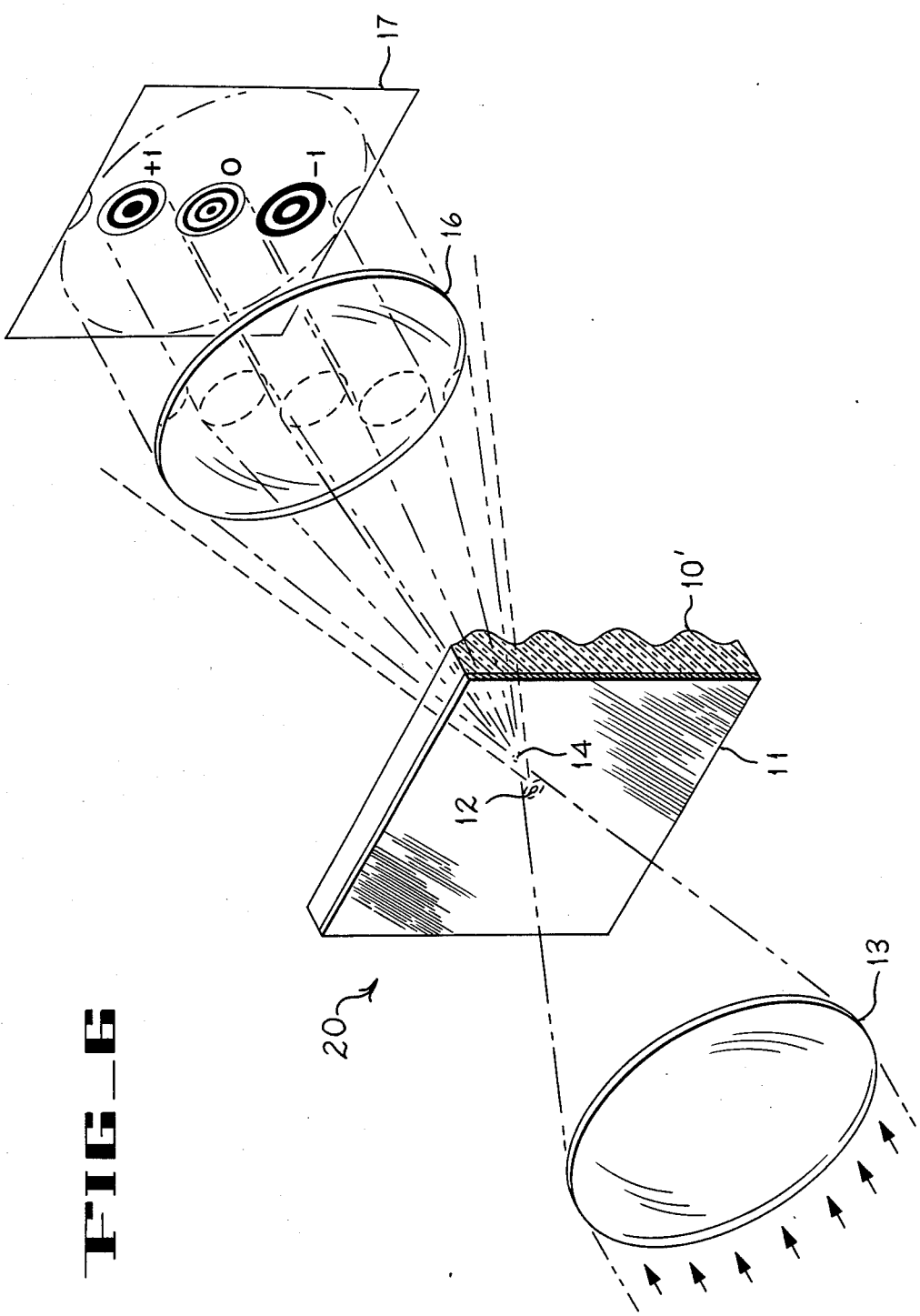
FIG_6

REAL-TIME DIFFRACTION INTERFEROMETER

TECHNICAL FIELD

This invention relates generally to optical interferometers, and pertains specifically to interferometric apparatus for monitoring quality of an optical beam wavefront on a real-time basis.

DESCRIPTION OF THE PRIOR ART

An overview of interferometric systems of the prior art appeared in a chapter entitled "Fringe Scanning Interferometers" by J. H. Bruning in *Optical Shop Testing*, edited by D. Malacara, John Wiley and Sons, pp. 409–437, (1978).

Various real-time interferometric systems of the prior art were evaluated by C. L. Koliopoulos in "Interferometric Optical Phase Measurement Techniques", a dissertation submitted to the University of Arizona in 1981 in partial fulfillment of the requirements for the degree of Doctor of Philosophy. Real-time interferometric systems used in the prior art generally employed electro-optical devices with auxiliary waveplates, polarizers and moving gratings.

An interferometric technique that is particularly relevant to the present invention is known as point diffraction interferometry (PDI), which was introduced by R. N. Smartt in 1972. Discussions of point diffraction interferometry have been published by R. N. Smartt and J. Strong in "Point-Diffraction Interferometer", *Journal of the Optical Society of America*, 62, p. 737, (1972), and by R. N. Smartt and W. H. Steel in "Theory and Application of PDI", *Japanese Journal of Applied Physics*, 14, Supp. 1, pp. 351–356, (1975).

A knowledge of point diffraction interferometry as practiced in the prior art would be useful in understanding the present invention. Therefore, a conventional point diffraction interferometer is described at this juncture with reference to FIGS. 1 and 2.

The point diffraction interferometer of FIG. 1 comprises a transparent substrate 10 (e.g., a sheet of glass or mica for visible wavelengths, or a sheet of silicon for infrared wavelengths) having a semi-transparent coating 11, which covers one side of the substrate except for a pinhole-sized area 12 (e.g., a circular spot with a diameter on the order of a few microns) that is left uncovered. The coating 11 could be formed by depositing a layer of translucent material (e.g., a layer of gold about a few hundred angstroms thick) on the substrate 10, with a mask being used to prevent the pinhole-sized area 12 from becoming coated during the deposition process. The uncoated pinhole-sized area 12 becomes a pinhole aperture for point diffraction interferometry.

A beam of optical radiation whose wavefront is to be analyzed is represented in FIG. 1 by a bundle of parallel rays incident upon a first converging lens 13, which (neglecting lens aberrations) brings the rays to a common focus at a focal point 14. The first converging lens 13 generally represents any suitable optical element or combination of optical elements for causing the beam to converge.

The substrate 10 is positioned in the beam at a location adjacent the focal point 14, and is generally transverse to the direction of propagation of the beam. In the drawing, the substrate 10 is shown positioned between the first converging lens 13 and the focal point 14, although the substrate 10 could be positioned on either side of the focal point 14 for practicing point diffraction interferometry. The translucent coating 11 on the substrate 10 reduces the intensity of the beam transmitted by the first converging lens 13.

A schematic representation of the point diffraction interferometer of FIG. 1 is shown in FIG. 2 wherein the optical beam to be analyzed is shown originating at an entrance pupil on an object plane 15. In accordance with ray-tracing convention, the beam is defined in FIG. 2 by upper and lower boundary rays directed from left to right. The wavefront of the beam is generally orthogonal to the direction of propagation of the beam, and passes from left to right with the velocity of propagation of the radiation (i.e., with the speed of light).

The beam wavefront passes along a path from the object plane 15 through the first converging lens 13 to the substrate 10. A major portion of the beam wavefront passes through the translucent coating 11 (thereby undergoing intensity attenuation) on the transparent substrate 10, and converges to a focus at the focal point 14. A minor portion of the beam wavefront passes with undiminished intensiy through the pinhole aperture 12, and thereby undergoes point diffraction into a generally spherical wavefront as discussed hereinafter.

An inverted image of the entrance pupil on the object plane 15 would be seen wherever an image screen might be placed in the path of the wavefront to the right of the focal point 14. To practice point diffraction interferometry, a second converging lens 16, which generally represents any suitable optical element or combination of optical elements for converging the beam, is placed in the path of the wavefront downstream (i.e., to the right) of the focal point 14. The second converging lens 16 causes the rays that were refracted by the first converging lens 13 to be refracted a second time so as to re-assume parallelism with respect to each other.

As shown in FIG. 2, the inverted image of the entrance pupil is formed on an image plane 17 positioned to the right of the second converging lens 16. In a practical application, the inverted image of the entrance pupil is formed on an exit pupil on the image plane 17, and a photodetector 18 is positioned at the exit pupil.

The generally vertical wavy lines extending between the boundary rays defining the beam in FIG. 2 represent successive positions of the beam wavefront. The major portion of the beam wavefront undergoes intensity attenuation at the translucent coating 11, but otherwise passes through the substrate 10 without change in wavefront quality. The minor portion of the beam wavefront passes through the pinhole aperture 12, and emerges to the right of the substrate 10 undiminished in intensity but with a substantially spherical wavefront in accordance with Huygens' Principle. This spherical wavefront originating at the pinhole aperture 12 can be considered as a reference wavefront.

The wavefront that is to be analyzed is diminished in intensity downstream of the substrate 10, and undergoes interference with the spherical reference wavefront. The second converging lens 16 collimates these two interfering wavefronts, and produces an interference pattern on the image plane 17. The thickness of the translucent coating 11 on the transparent substrate 10 is chosen so that the intensity of the major portion of the beam wavefront transmitted therethrough is approximately equal to the intensity of the minor portion of the beam wavefront passing directly through the pinhole aperture 12. It is preferable for these two interferring wavefronts to be of approximately equal intensity in order to maximize the contrast in the resulting interference pattern appearing in an interferogram at the image plane 17.

The interferogram showing the interference between the test wavefront originating at the entrance pupil of the object plane 15 and the reference wavefront originating at the pinhole aperture 12 indicates the optical quality of the test wavefront. Interferograms can be continuously displayed at the image plane 17 to monitor changes occurring in the test wavefront on a real-time basis. Any degradation or aberration occurring in the test wavefront at the object plane 15 would result in a change in the interferogram observed at the image plane 17. Mathematically, the complex amplitude of the test wavefront at the object plane 15 can be written as $$U_1(x,y) = cyl\left[\frac{(x^2+y^2)^{\frac{1}{2}}}{D}\right] \exp\left\{i\frac{2\pi}{\lambda} W(x,y)\right\}, \quad (1)$$

where $U_1(x,y)$ is a spatial wavefront function expressed in coordinates x and y of an orthogonal cartesian coordinate system on the object plane 15. The term cyl $[(x^2+y^2)^{\frac{1}{2}}/D]$ in equation (1) is an aperature function defining an object beam of diameter D, and $W(x,y)$ is a function representing the optical path difference between the theoretical or desired wavefront and the actual wavefront as aberrated. The optical path difference is measured at wavelength $\lambda$.

The amplitude transmittance $t_A$ of the point diffraction interferometer is defined by the expression $$t_A(x,y) = t_b + (1-t_b) cyl\left[\frac{\{(x-x_0)^2+(y-y_0)^2\}^{\frac{1}{2}}}{d}\right], \quad (2)$$

where the first term $t_b$ represents the amplitude transmittance of the partially transmitting portion of the interferometer, and where the second term represents the amplitude transmittance of the totally transmitting circular pinhole aperture 12 of diameter d. Equation (2) has been generalized for the case in which the pinhole aperture 12 has been shifted from the origin of the coordinate system by $(x_0, y_0)$.

The resultant amplitude distribution $U_3(x,y)$ of the interfering wavefronts at the image plane 17 is obtained by combining equations (1) and (2) to give $$U_3(x,y) = t_b \exp\left\{i\frac{2\pi}{\lambda} W(x,y)\right\} cyl\left[\frac{(x^2+y^2)^{\frac{1}{2}}}{D}\right] + \quad (3)$$

$$(1-t_b)\frac{\pi}{4}\frac{d^2}{\lambda f} \exp\left\{-i\frac{2\pi}{\lambda f}(x_0 x - y_0 y)\right\}$$

$$** cyl\left[\frac{(x^2+y^2)^{\frac{1}{2}}}{D}\right] \exp\left\{i\frac{2\pi}{\lambda} W(x,y)\right\},$$

where each asterisk * denotes convolution, and f is the focal length of the first converging lens 13.

The first term in equation (3) represents the amplitude of the undiffracted wavefront as attenuated by the translucent coating 11. The second term in equation (3) represents the amplitude of the spherical wavefront generated by convolution of the undiffracted wavefront with the Fourier transform of the pinhole aperture 12.

After the convolution has been performed, the amplitude distribution function $U_3(x,y)$ can be simplified as $$U_3(x,y) = t_b \exp\left\{i\frac{2\pi}{\lambda} W(x,y)\right\} + \quad (4)$$

$$t_R' \exp\left\{-i\frac{2\pi}{\lambda}(x_0 x + y_0 y)\right\},$$

where $t_R'$ is the amplitude of the spherical (i.e., the reference) wavefront.

The intensity distribution (i.e., the modulus square of the amplitude distribution) of the interference pattern at the image plane 17 is $$I_3(x,y) = |U_3(x,y)|^2 = \quad (5)$$

$$t_b^2 + t_R'^2 + 2t_b t_R' \cos\left[\frac{2\pi}{\lambda} W(x,y) + \frac{2\pi}{\lambda f}(x_0 x + y_0 y)\right].$$

This intensity distribution $I_3(x,y)$ produces an interference pattern that is similar to the interference pattern obtained using a conventional Twyman-Green type of interferometer.

The size of the pinhole aperture 12 should be small enough to produce a high-quality spherical wavefront, yet large enough to transmit a useful amount of energy. A study reported by C. Koliopoulos et al. in an article entitled "Infrared Point-Diffraction Interferometer" published in *Optical Letters* 3, pp. 118–120, (1978), indicates that if the pinhole size is less than the diameter of the Airy disk spot of the focussed wavefront, the resulting spherical wavefront is better than $\lambda/20$ rms, with 0.1 percent to 10 percent energy efficiency depending upon the position $(x_0, y_0)$ of the pinhole aperture 12.

A number of techniques were used in the prior art for obtaining real-time interferometric data from conventional interferometers. One such technique, which has relevance to the present invention, is characterized generally as phase-shifting interferometry. Heretofore, however, no feasible method had been known for using a point diffraction interferometer in practicing phase-shifting interferometry.

In general, the intensity $I(x,y)$ of an interference pattern can be expressed by the equation $$I(x,y) = I_0(x,y)[1 + \gamma \cos \phi(x,y) + \delta], \quad (6)$$

where $I_0(x,y)$ is the average intensity, $\gamma$ is the fringe contrast, and $$\phi(x,y) = \frac{2\pi}{\lambda} W(x,y)$$

is the phase value to be measured, and $\gamma$ is an arbitrary relative phase constant. If the values of intensity are measured at three different shifted phase values, the unknown values of $\phi(x,y)$ can be deduced without $2\pi$ modulus ambiguity. Thus, by selecting the values $\delta = \pi/4$, $\delta = 3\pi/4$ and $\delta = 5\pi/4$ for the relative phase constant, the intensity $I_A$ at $\delta = \pi/4$ is given by $$I_A(x,y) = I_0 \left[ 1 + \gamma \cos\left( \phi(x,y) + \frac{\pi}{4} \right) \right] \quad (7)$$

$$= I_0 [1 + \gamma \{\cos \phi(x,y) - \sin \phi(x,y)\}/\sqrt{2}\,],$$

the intensity $I_B$ at $\delta = 3\pi/4$ is given by $$I_B(x,y) = I_0 \left[ 1 + \gamma \left( \cos \phi(x,y) + \frac{3\pi}{4} \right) \right] \quad (8)$$

$$= I_0 [1 + \gamma \{-\cos \phi(x,y) - \sin \phi(x,y)\}/\sqrt{2}\,],$$

and the intensity $I_C$ at $\gamma = 5\pi/4$ is given by $$I_C(x,y) = I_0 \left[ 1 + \gamma \left( \cos \phi(x,y) + \frac{5\pi}{4} \right) \right] \quad (9)$$

$$= I_0 [1 + \gamma \{-\cos \phi(x,y) + \sin \phi(x,y)\}/\sqrt{2}\,].$$

Combining equations (7), (8) and (9) yields $$\tan \phi(x,y) = \frac{I_C - I_B}{I_A - I_B}, \quad (10)$$

which can be rewritten in the form $$\phi(x,y) = \tan^{-1} \left[ \frac{I_C - I_B}{I_A - I_B} \right], \quad (11)$$

In conventional phase-shifting interferometry, electro-optical devices, polarizing beam-splitters, waveplates or piezoelectric transducers are used to introduce a constant amount of phase change into interference patterns detected by solid-state array detectors 18 located at the image 17 plane of the interferometric system. In this way, intensity measurements $I_A$, $I_B$ and $I_C$ can be made for $\delta = \pi/4,$ $\delta = 3\pi/4$ and $\delta = 5\pi/4,$ respectively, from which $\phi(x,y)$ can be calculated.

In the prior art, the only way the various intensity values $I_A$, $I_B$ and $I_C$ could be measured was serially using sequential phase shifting methods. Instantaneous monitoring of the wavefront was not achieved in the prior art.

SUMMARY OF THE INVENTION

It is an object of the present invention to provide an interferometric technique for monitoring the quality of an optical beam wavefront on a real-time basis.

It is a more particular object of the present invention to provide a wavefront sensor, which can provide real-time information at a high data processing rate by a simultaneous phase-shifting interferometric technique.

It is likewise a particular object of the present invention to provide a technique whereby point diffraction interferometry can be used in conjunction with phase-shifting interferometry to monitor the quality of an optical beam wavefront.

In accordance with the present invention, a transmission-type (either amplitude or phase) diffraction grating is positioned on or immediately adjacent a point diffraction interferometer. The diffraction grating causes the attenuated beam wavefront transmitted through the translucent coating of the point diffraction interferometer to be diffracted into a zeroth-order component and higher-order components, where phase changes are introduced between the resulting wavefronts of the different components. The present invention thereby eliminates the need for auxiliary devices for producing phase changes.

DESCRIPTION OF THE DRAWING

FIG. 1 is an isometric representation of a point diffraction interferometer of the prior art.

FIG. 2 is a schematic representation of the point diffraction interferometer of FIG. 1.

FIG. 3 is perspective view of a pinhole-apertured substrate and diffraction grating of a real-time diffraction interferometer in accordance with the present invention.

FIG. 4 is a fragmentary cross-sectional view of an alternative embodiment of the pinhole-apertured substrate and diffraction grating of the present invention.

FIG. 5 is a cross-sectional view of the pinhole-apertured substrate and diffraction grating of FIG. 3.

FIG. 6 is an isometric representation of the real-time diffraction interferometer of the present invention illustrating a set of interferograms produced by interference of the spherical reference wavefront with the zeroth order and the positive and negative first order diffraction components of the test wavefront.

BEST MODE OF CARRYING OUT THE INVENTION

A real-time diffraction interferometer in accordance with the present invention comprises a pinhole-apertured translucent substrate in combination with a diffraction grating. The pinhole-apertured substrate and diffraction grating are preferably formed on a single integral structure, e.g., the apertured grating structure 20 shown in FIG. 3. However, the pinhole-apertured substrate and diffraction grating of the present invention could alternatively comprise a pinhole-apertured translucent substrate structure (as in FIGS. 1 and 2) and a separate diffraction grating structure. It is necessary that the diffraction grating be located adjacent the pinhole aperture in the translucent substrate, but the diffraction grating could be located on either side of the substrate.

With reference to FIG. 3 (wherein the reference numbers used in FIGS. 1 and 2 are retained), the optical beam whose wavefront is to be analyzed is seen converging to the focal point 14. The apertured grating structure 20 is shown positioned in the converging beam upstream of the focal point 14, although it is immaterial whether the apertured grating structure 20 is positioned upstream of the focal point 14 where the beam converges or downstream of the focal point 14 where the beam diverges.

The apertured grating structure 20 comprises a substantially transparent substrate 10' corresponding to the transparent substrate 10 of FIGS. 1 and 2. A first side of the substrate 10' (i.e., the obverse side in FIG. 3) is planar, and is coated with the translucent coating 11 to attenuate the intensity of the beam converging to a focus at the focal point 14. The pinhole-sized aperture 12 in the translucent coating 11 permits a portion of the beam to be transmitted through the substrate 10' with undiminished intensity, but causes this unattenuated portion of the beam to undergo pinhole diffraction so as to emerge on a second side of the substrate 10' (i.e., on the reverse side in FIG. 3) with a spherical wavefront. The reverse side of the substrate 10' is configured as a diffraction grating. As illustrated in FIG. 3, the reverse side of the substrate 10' has a lenticulate surface configuration to form the diffraction grating.

In an alternative embodiment of the present invention, as illustrated in FIG. 4, the translucent coating 11 could be provided on the same side of the substrate 10' as the diffraction grating. Thus, in FIG. 4, the translucent coating 11 is shown as being of substantially uniform thickness covering the lenticulate surface on the reverse side of the substrate 10' except for the pinhole-sized area that is left uncoated so as to function as the pinhole aperture 12 for point diffraction interferometry.

As shown in vertical cross section in FIG. 5, the reverse (i.e., downstream) side of the substrate 10' of FIG. 3 has a cosinusoidal lenticulate surface configuration. The intensity-attenuated beam transmitted by the translucent coating 11 is diffracted by the lenticulate surface of the substrate 10' into a zeroth order component and various positive and negative higher order components. Only the zeroth order component and the positive and negative first order components are needed in practicing real-time diffraction interferometry in accordance with the present invention.

Interference occurs between the spherical wavefront originating at the pinhole aperture 12 and each of the wavefronts of the zeroth and higher-order diffraction components produced by the diffraction grating. The interference patterns resulting from interference between the spherical wavefront and the zeroth and the positive and negative first order diffraction components are separately imaged on detectors 21, 22 and 23 positioned at the image plane 17, as shown in FIG. 5. The detectors 21, 22 and 23, which may be conventional solid state photodetectors, measure the intensity distributions of the respective interference patterns. Alternatively, a single photodetector could be used in conjunction with a scanning device to measure the intensity distributions of the respective interference patterns sequentially.

Interferograms of the interference patterns resulting from interference between the spherical wavefront and the zeroth and the positive and negative first order diffraction components of the intensity-diminished transmitted wavefront, which is the wavefront to be analyzed, are illustrated in FIG. 6. An analysis of the three interference patterns shown in FIG. 6 is similar to the analysis described above for the single interference pattern produced by a conventional point diffraction interferometer.

The apertured grating structure 20 can be moved upstream or downstream along the path of the beam being analyzed, as indicated by the arrows A and B in FIG. 3, in order to control the focus. Similarly, at any given position along the path of the beam, the apertured grating structure 20 can be moved up or down, and to the left or to the right, as indicated by the arrows C or D and E or F in FIG. 3, in order to vary the position $(x_0, y_0)$ of the pinhole aperture 12. Such movement up or down, or to the left or to the right, causes tilt variation in the interferograms at the image plane 17.

For a real-time diffraction interferometer in accordance with the present invention, the transmittance $t_B$ of the combined point diffraction interferometer and diffraction grating comprising the apertured grating structure 20 (assuming a cosinusoidal grating) is define by the expression $$t_B(x,y) = t_g[1 + \beta \cos 2\pi \xi'(x - x_g)] t_A(x,y), \tag{12}$$

where $t_g$ is the transmittance of the diffraction grating, $\beta$ is the efficiency of the diffraction grating, $\xi'$ is the line frequency of the diffraction grating, and $x_g$ is the relative position of the pinhole aperture 12 with respect to the period of the diffraction grating.

The intensity distributions for the interference patterns produced on the detectors 21, 22 and 23, i.e., the three counterparts of equation (6) above, are as follows:

$$I_A = t_1^2 + t_2^2 \cos\left(\phi(x,y) + \frac{2\pi}{\lambda f}(x_0 x + y_0 y)\right), \tag{13}$$

for the zeroth order component of the diffracted wavefront (i.e., the undiffracted component of the wavefront);

$$I_B = t_1^2 + \beta t_2^2 \cos\left(\phi(x - x', y) + \frac{2\pi}{\lambda f}(x_0 x + y_0 y) + 2\pi \xi' x_g\right) \tag{14}$$

for the positive first-order component of the diffracted wavefront;

$$I_C = t_1^2 + \beta t_2^2 \cos\left(\phi(x + x', y) + \frac{2\pi}{\lambda f}(x_0 x + y_0 y) - 2\pi \xi' x_g\right) \tag{15}$$

and for the negative first-order component of the diffracted wavefront.

In equations (13), (14) and (15), the phase change $$\Delta\phi = \frac{2\pi}{\lambda f} x' x_g, \tag{16}$$

represents the phase difference between any two of the three different diffracted orders imaged on the detectors 21, 22 and 23 at the image plane 17, where $x' = \lambda f \xi'$.

The minimum line frequency of the diffraction grating is determined by the separation requirement of the diffracted pupils for the given F-number of the test wavefront, i.e., $$\xi' \geq \frac{1}{2\lambda F}. \tag{17}$$

The size of the pinhole aperture 12 is sufficiently smaller than the grating period to minimize phase error in the spherical wavefront. The amount of the phase shift $\Delta\phi$ can be adjusted for arbitrary values between 0 and $\pi$ by appropriately adjusting the position $x_g$ of the pinhole aperture 12 with respect to the period of the diffraction grating.

The intensity distribution for the interference patterns appearing on the detectors 21, 22 and 23 can be determined by using commercially available solid state arrays for the detectors 21, 22 and 23. Intensity readouts from these detector arrays enable the phase values of the positive and negative first-order components of the diffracted wavefront relative to the zeroth-order component of the wavefront to be uniquely determined. In the embodiment of the invention illustrated in FIGS. 3, 5 and 6, the undiffracted (i.e., zeroth-order) component of the wavefront and the positive and negative first-order diffracted components of the wavefront are parallel to each other, and hence require three separate channels for detection of the corresponding interference patterns.

By eliminating the need for electro-optical components for obtaining real-time inteferometric data, the present invention provides a significant simplification in instrumentation in comparison with the prior art. Furthermore, the present invention enables higher-speed interferometric data processing than could be achieved using real-time interferometric techniques of the prior art.

Since real-time diffraction interferometry according to the present invention utilizes a translucent substrate having a pinhole aperture in combination with a diffraction grating, an instrument according to the present invention is not limited to use in the visible region of the optical spectrum. In principle, the technique described herein could also be applied to real-time monitoring of wavefront quality for beams in the ultraviolet and infrared wavelengths, and could be used for both continuous and pulsed laser systems.

Particular embodiments have been described herein for a real-time diffraction interferometer in accordance with the present invention. However, other embodiments suitable for particular applications would become apparent to workers skilled in the art upon perusual of the foregoing specification and accompanying drawing. The description presented herein is to be understood as being illustrative of the invention, which is more generally defined by the following claims and their equivalents.

I claim:

1. Apparatus for monitoring quality of an optical beam wavefront, said apparatus comprising:
   (a) converging means for bringing said beam to a focus;
   (b) separating means positionable in said beam downstream of said converging means, said separating means being only partially transparent to said beam except for a pinhole-apertured portion of said separating means that is substantially transparent to said beam, said separating means comprising homogeneous diffraction grating means of uniform grating period for causing a first portion of said beam to be separated into a plurality of components, said components of said first portion of said beam being of different phases with respect to each other, said pinhole-apertured portion of said separating means defining an aperture that is dimensioned to function as a point diffraction means for causing a second portion of said beam to be transmitted with a substantially spherical wavefront, said second portion of said beam undergoing interference with each of said components of said first portion of said beam; and
   (c) detecting means positionable downstream of said separating means, said detecting means separately indicating the interference of each of said components of said first portion of said beam with said second portion of said beam.

2. The apparatus of claim 1 wherein said aperture has a maximum dimension smaller than said grating period.

3. The apparatus of claim 1 wherein said separating means comprises a substrate that is translucent to said beam, said substrate supporting said homogeneous diffraction grating means of uniform grating period, said aperture being positioned on said substrate with respect to said diffraction grating so as to determine the phase difference between any two of said components of said first portion of said beam.

4. The apparatus of claim 3 wherein a surface of said substrate is lenticulate to define said diffraction grating.

5. The apparatus of claim 3 wherein said substrate comprises a material that is substantially transparent to said beam, an area on one side of said substrate being coated with a translucent coating except for a portion of said one side within said coated area that is left uncoated, said coating providing intensity attenuation of said first portion of said beam, said uncoated portion of said one side of said substrate functioning as said aperture.

6. The apparatus of claim 5 wherein said translucent coating attenuates the intensity of said first portion of said beam so that each of said components of said first portion of said beam produced by said diffraction grating is approximately equal in intensity to said second portion of said beam transmitted through said aperture.

7. The apparatus of claim 5 wherein said translucent coating is provided on an obverse side of said substrate, and wherein a reverse side of said substrate is configured as said diffraction grating.

8. The apparatus of claim 7 wherein said reverse side of said substrate is lenticulate.

9. The apparatus of claim 5 wherein said translucent coating is provided on said surface of said substrate that is configured as said diffraction grating.

10. The apparatus of claim 9 wherein said surface configured as said diffraction grating is lenticulate.

11. The apparatus of claim 1 wherein said detecting means comprises a plurality of photodetectors positioned so that each photodetector indicates the interference of a corresponding one of said components of said first portion of said beam with said second portion of said beam.

12. An apertured grating structure for separating an optical beam into first and second portions, said grating structure having a homogeneous diffraction grating of uniform grating period for causing said first portion of said beam to be diffracted into a plurality of components corresponding to different diffraction orders, said components of said first portion of said beam produced by said diffraction grating being of different phases with respect to each other, said grating structure being only partially transparent to said beam except for an apertured portion of said grating structure that is substantially transparent to said beam, said apertured portion of said grating structure defining a pinhole aperture that is dimensioned to cause said second portion of said beam to have a substantially spherical wavefront, said second portion of said beam interfering with each of said components of said first portion of said beam so as to produce a plurality of separate interference patterns of different phases with respect to each other, said aperture being positioned on said grating structure with respect to said diffraction grating so as to enable a selected phase difference between any two of said components of said first portion of said beam to be obtained.

13. The apertured grating structure of claim 12 wherein said grating structure has a surface configured as said diffraction grating.

14. The apertured grating structure of claim 13 comprising a substrate that is substantially transparent to said beam, an area on one side of said substrate being coated with a translucent coating except for a portion of said one side within said coated area that is left uncoated, said coating causing attenuation in intensity of said optical beam so that each of said plurality of components of said first portion of said beam has an intensity approximately equal to the intensity of said second portion of said beam, said uncoated portion of said one side of said substrate defining said aperture.

15. The apertured grating structure of claim 14 wherein said translucent coating is provided on an obverse side of said substrate, and wherein said surface configured as said diffraction grating is provided on a reverse side of said substrate.

16. The apertured grating structure of claim 15 wherein said reverse side of said substrate is lenticulate.

17. The apertured grating structure of claim 17 wherein said translucent coating is provided on said surface that is configured as said diffraction grating.

18. The apertured grating structure of claim 17 wherein said surface configured as said diffraction grating is lenticulate.

* * * * *